United States Patent
Shapiro et al.

(10) Patent No.: US 7,295,525 B2
(45) Date of Patent: Nov. 13, 2007

(54) SYSTEM AND METHOD FOR MANAGING MULTICAST GROUP MEMBERSHIP

(75) Inventors: Jeremy N. Shapiro, Brighton, MA (US); Stephen A. Jay, Chelmsford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 942 days.

(21) Appl. No.: 10/660,196

(22) Filed: Sep. 11, 2003

(65) Prior Publication Data

US 2005/0058085 A1 Mar. 17, 2005

(51) Int. Cl.
*H04L 12/28* (2006.01)
*H04L 12/56* (2006.01)
*H04J 3/26* (2006.01)

(52) U.S. Cl. ............... 370/256; 370/400; 370/401; 370/432

(58) Field of Classification Search ........... 370/256, 370/432, 400, 401, 408, 409, 395.1, 396, 370/395.52, 412, 230.1, 236
See application file for complete search history.

(56) References Cited

U.S. PATENT DOCUMENTS

| | | | |
|---|---|---|---|
| 5,331,637 A * | 7/1994 | Francis et al. ............. 370/408 |
| 5,946,316 A * | 8/1999 | Chen et al. ................. 370/408 |
| 2003/0142671 A1* | 7/2003 | DeRango et al. .......... 370/390 |
| 2005/0086300 A1* | 4/2005 | Yeager et al. ............... 709/204 |
| 2006/0168104 A1* | 7/2006 | Shimizu et al. ............ 709/218 |

\* cited by examiner

*Primary Examiner*—Firmin Backer
*Assistant Examiner*—Farah Faroul
(74) *Attorney, Agent, or Firm*—Park, Vaughan & Fleming LLP

(57) ABSTRACT

A system and method for efficiently managing membership in a multicast communication group. The system may comprise any number of end nodes (e.g., channel adapters, network interface adapters) and routing nodes (e.g., switches), and the method may be implemented by a processor coupled to any node. Each node in a network may be a member of the multicast group and/or the multicast tree (MCT) that routes the group's multicast communications. A node need not be a member of the group to be a member of the tree. Network links included in the multicast tree (MCT) are a subset of a network minimum spanning tree (MST). When a node is added to the group, the minimum spanning tree (MST) is searched from that node until a node within the multicast tree (MCT) is found. Each time a member is removed from the group, the multicast tree (MCT) is pruned to reduce unneeded communications.

23 Claims, 3 Drawing Sheets

SYSTEM AND METHOD FOR MANAGING MULTICAST GROUP MEMBERSHIP

BACKGROUND

This invention relates to the fields of computer systems and networking. More particularly, a system and methods are provided for efficiently supporting multicast communications and multicast group membership in a network.

Networking architectures such as InfiniBand support multicast traffic in which one node issues or forwards a communication to multiple other nodes in a specified multicast group. In InfiniBand, network nodes include switches and channel adapters. Both types of nodes can be members of a multicast group. A group member may be configured to receive all multicast communications sent by other members and may also issue multicast communications. Or, a member may be configured to only send multicast communications, in which case it is not an end-consumer of the group's multicast communications.

Traditional multicast schemes often allow network nodes to forward a multicast communication to a neighboring node even if correct operation of the multicast group does not require the neighboring node to receive the communication. For example, after a node leaves a multicast group, it may continue to receive group traffic for some time, until group membership is updated.

Or, when an end node is removed from a group, an intermediate network node that only forwarded group communications to the end node, but which did not use the communications itself, may not be removed. These deficiencies would cause extra, unneeded traffic within the network. Meanwhile, the larger a network and the more members in a multicast group, the more important it becomes to keep traffic to a minimum.

In traditional multicast schemes, an intermediate or end node might only be removed when the multicast network was periodically rebuilt based on current end node membership. Rebuilding a multicast group network only after multiple changes have been made to the group's membership typically requires a great deal of management traffic.

SUMMARY

Therefore, there is a need for a system and method for dynamically maintaining a minimal or near-minimal network for disseminating a group's multicast messages, and efficiently managing membership in a multicast communication group.

In one embodiment, the system may comprise any number of end nodes (e.g., channel adapters, network interface adapters) and routing nodes (e.g., switches), and the method may be implemented by a processor coupled to any node. Each node in a network may be a member of the multicast group and/or the multicast tree (MCT) that routes the group's multicast communications. A node need not be a member of the group to be a member of the tree. Network links included in the MCT are a subset of a network minimum spanning tree (MST). When a node is added to the group, the MST is searched from that node until a node within the MCT is found. Each time a member is removed from the group, the MCT is pruned to reduce unneeded communications.

DETAILED DESCRIPTION

Figure 1:
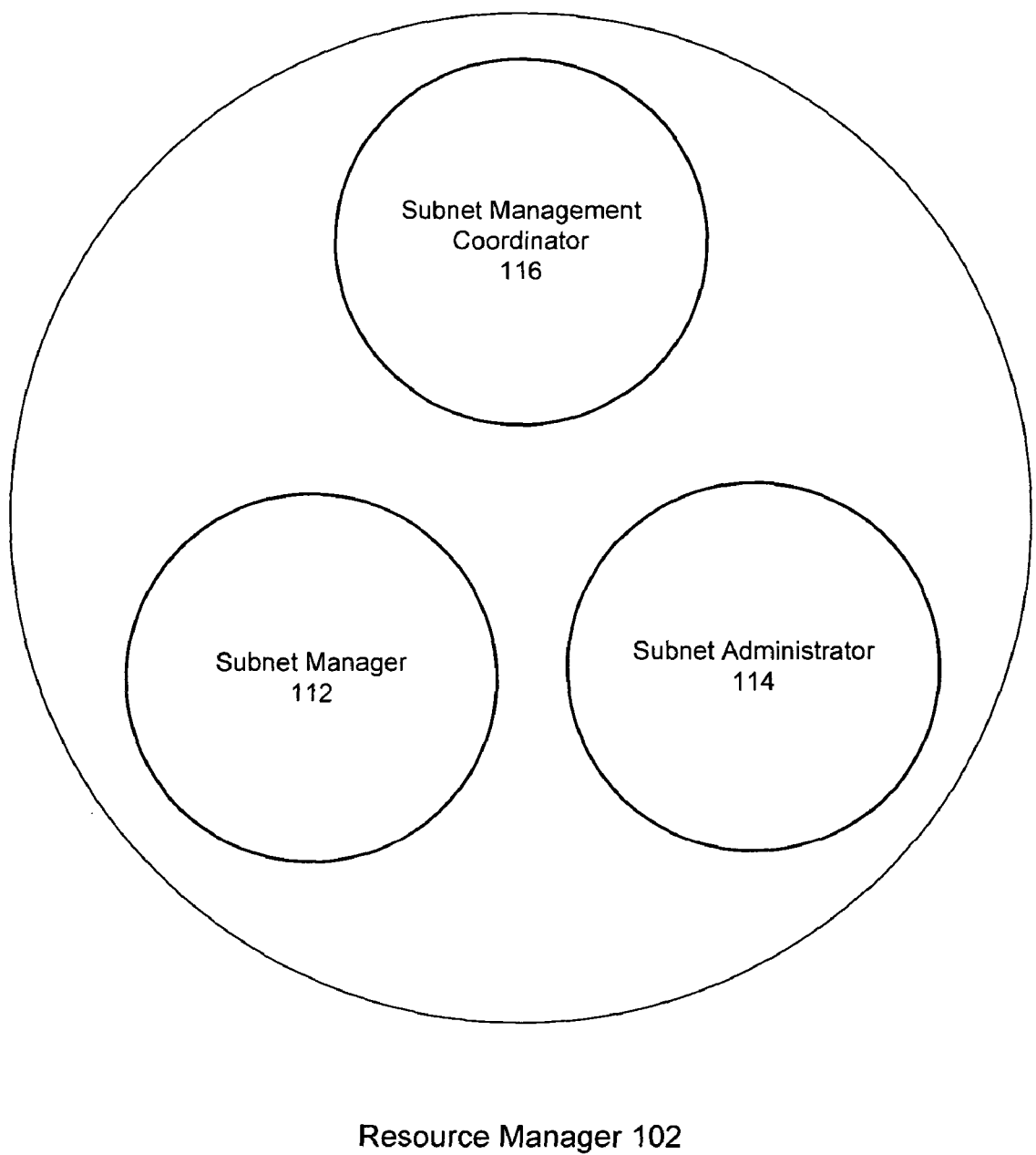
FIG. 1 is a block diagram depicting a system for dynamic and efficient maintenance of a multicast communication subnetwork, in accordance with one embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer, a special-purpose computer or a network component (e.g., a switch, a network interface device). Details of such devices (e.g., processor, memory, data storage, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory, carrier waves and transmission media (e.g., copper wire, coaxial cable, fiber optic media). Exemplary carrier waves may take the form of electrical, electromagnetic or optical signals conveying digital data streams along a local network, a publicly accessible network such as the Internet or some other communication link.

In one embodiment of the invention, a system and method are provided for managing membership in a multicast group and managing the configuration of a multicast tree (MCT) for routing the group's multicast communications. Embodiments of the invention are described below as they may be implemented within an InfiniBand environment. One skilled in the art will appreciate, however, that the invention is not limited to any particular network or communication technologies, and may be adapted for various such technologies.

A multicast group may include virtually any number of member nodes within a network, which may include channel adapters, network interface circuits, switches and/or other communication devices. Besides membership in a multicast group, a network node may or may not be a member of the set of nodes through which multicast messages are routed or disseminated—the group's MCT. A group's multicast tree constitutes a logical tree. In one embodiment, an MCT is a subset of a minimum spanning tree (MST) for the network. Membership in a group's MCT does not necessarily indicate membership in the group itself.

A network node may have one of three statuses with regard to a particular multicast group and the multicast tree that disseminates the group's messages: FullMember, SendOnlyMember and NonMember. A node's group membership status may be referred to as its GroupStatus (or GS); its status in the group's MCT may be referred to as its TreeStatus (or TS).

The terms FullMember, SendOnlyMember and NonMember may or may not correspond precisely to their meaning in the InfiniBand specification. TABLE 1 explains the various permutations of a node's GroupStatus and TreeStatus, some of which are invalid, and describes the node's capabilities for each permutation.

TABLE 1

| GroupStatus | TreeStatus | Comment |
| --- | --- | --- |
| NonMember | NonMember | Node does not initiate, receive, consume or forward messages |
| SendOnlyMember | NonMember | Invalid |
| FullMember | NonMember | Invalid |
| NonMember | SendOnlyMember | Node does not initiate or consume messages; node receives and forwards messages from nodes having TreeStatuses of SendOnly |
| SendOnlyMember | SendOnlyMember | Node initiates, but does not consume messages; node receives and forwards from nodes having TreeStatuses of SendOnly |
| FullMember | SendOnlyMember | Invalid |
| NonMember | FullMember | Node does not initiate or consume messages; node receives and forwards messages |
| SendOnlyMember | FullMember | Node initiates but does not consume messages; node receives and forwards messages |
| FullMember | FullMember | Node initiates, consumes, receives and forwards messages |

In one or more embodiments of the invention, a multicast group will always include at least one FullMember. Illustratively, a node can always initiate a message to a multicast group, but the message may or may not be routed properly, depending on whether the MCT is configured appropriately.

In an embodiment of the invention, each member of a group's MCT that is a switch (or other routing device) maintains a multicast forwarding table (MFT) indicating how it should treat the multicast messages it receives. For each active multicast group in the network, each switch in a group's tree can set individual ports of the switch on or off for the group.

For each outgoing port that is on when a multicast message is received for the group, the switch forwards the message to the link partner of that port (unless, perhaps, the message was received on that port). The link partner may be another switch or an end node (e.g., a channel adapter). If not an end node, the link partner may forward the message to one or more other nodes.

FIG. 1 depicts a system for efficiently managing the membership of network nodes in a multicast group and configuration of the group's multicast tree (MCT) corresponding to the group, according to one embodiment of the invention. The multicast tree comprises a subset of the nodes of the network, and may therefore be considered a subnet or subnetwork. Dissemination of a multicast message throughout the MCT or subnetwork ensures that the message reaches every network node that is a member of the group. A network node's membership status in the multicast group may differ from its membership status in the MCT.

In this embodiment, resource manager 102 is a program module responsible for managing membership in a multicast group and configuration of the group's multicast tree. Resource manager 102 may manage multiple groups and subnetworks, or multiple instances of the resource manager may be spawned, with each instance responsible for maintaining MCTs or subnets for one or more corresponding multicast groups.

Resource manager 102 comprises subnet manager 112, subnet administrator 114 and subnet management coordinator 116. Resource manager 102 and/or its components may execute on, or attached to, one node of the network, or may be distributed among different nodes. A resource manager may comprise one or more instances of each subcomponent illustrated in FIG. 1. However, in one embodiment of the invention, a single instance of the resource manager, and its components, executes on a computer system coupled to an end node (e.g., a channel adapter) or intermediate node (e.g., a switch) that is a member of the group's MCT.

Subnet manager 112 is responsible for configuring an MCT or subnet for a specified multicast group. To facilitate its work, the subnet manager is informed of all network links and nodes. The subnet manager may publish the group's MCT throughout the network whenever it is updated, with some specified periodicity, or on some other schedule. Each switching or other routing component of the MCT may update its MFT when it receives an updated MCT.

Subnet administrator 114 is responsible for receiving group membership changes (e.g., requests from network nodes to join or leave the group) and passing the changes to subnet manager 112 for execution.

Subnet management coordinator 116 facilitates the sharing of information between subnet manager 112 and subnet administrator 114. The subnet management coordinator may also execute algorithms for adding/removing members to/from a group and/or its multicast tree.

Resource manager 102 and its components support at least two operations: adding a node to a group and removing a node from a group.

The configuration of FIG. 1 does not limit the configuration of other systems assembled according to other embodiments of the invention. For example, the functions of subnet manager 112, subnet administrator 114 and subnet management coordinator 116 may be distributed among the illustrated modules and/or other modules in a manner other than as described above, or may be consolidated into fewer modules. For example, subnet manager 112 may comprise much, if not all, of the functionality of subnet administrator 114 and/or subnet management coordinator 116.

In one embodiment of the invention, procedures for adding a node to a group and removing a node from a group begin similarly, in that each operation to be performed is enqueued on a work queue. The system (e.g., a subnet manager, a subnet management coordinator) dequeues operations from the work queue and enqueues other nodes to be added as needed (e.g., to add a requested node to the group).

A minimum spanning tree (MST) is maintained for the network in which the multicast group exists. The MST may be maintained by one of the components depicted in FIG. 1, or by some other entity in the network. Embodiments of the invention described herein do not depend upon the location of the MST or the manner in which it is maintained or disseminated.

In a present embodiment of the invention, only links that are in the network's MST may be included in a group's MCT. Therefore, it can be ensured that the group's MCT will form a tree.

For the purpose of identifying members of a multicast group, a multicast tree (MCT) and a network minimum spanning tree (MST), channel adapters and ports of a switch or other routing device may be identified by GID (Global IDentification) and/or port number, or via some other identifier(s). Each node's group and MCT memberships and membership statuses are stored in a resource manager or a component of a resource manager.

In an embodiment of the invention, a subnet management coordinator (e.g., coordinator 116 of FIG. 1) keeps track of groups, corresponding MCTs and the membership statuses of nodes. To correctly track group membership, the subnet management coordinator will specifically need to differentiate between members (i.e., FullMembers and SendOnlyMembers) and non-members (i.e., NonMembers). The coordinator also disseminates multicast routing or forwarding table updates among network nodes. To do so, the coordinator will differentiate between FullMembers and SendOnlyMembers.

Figure 2:
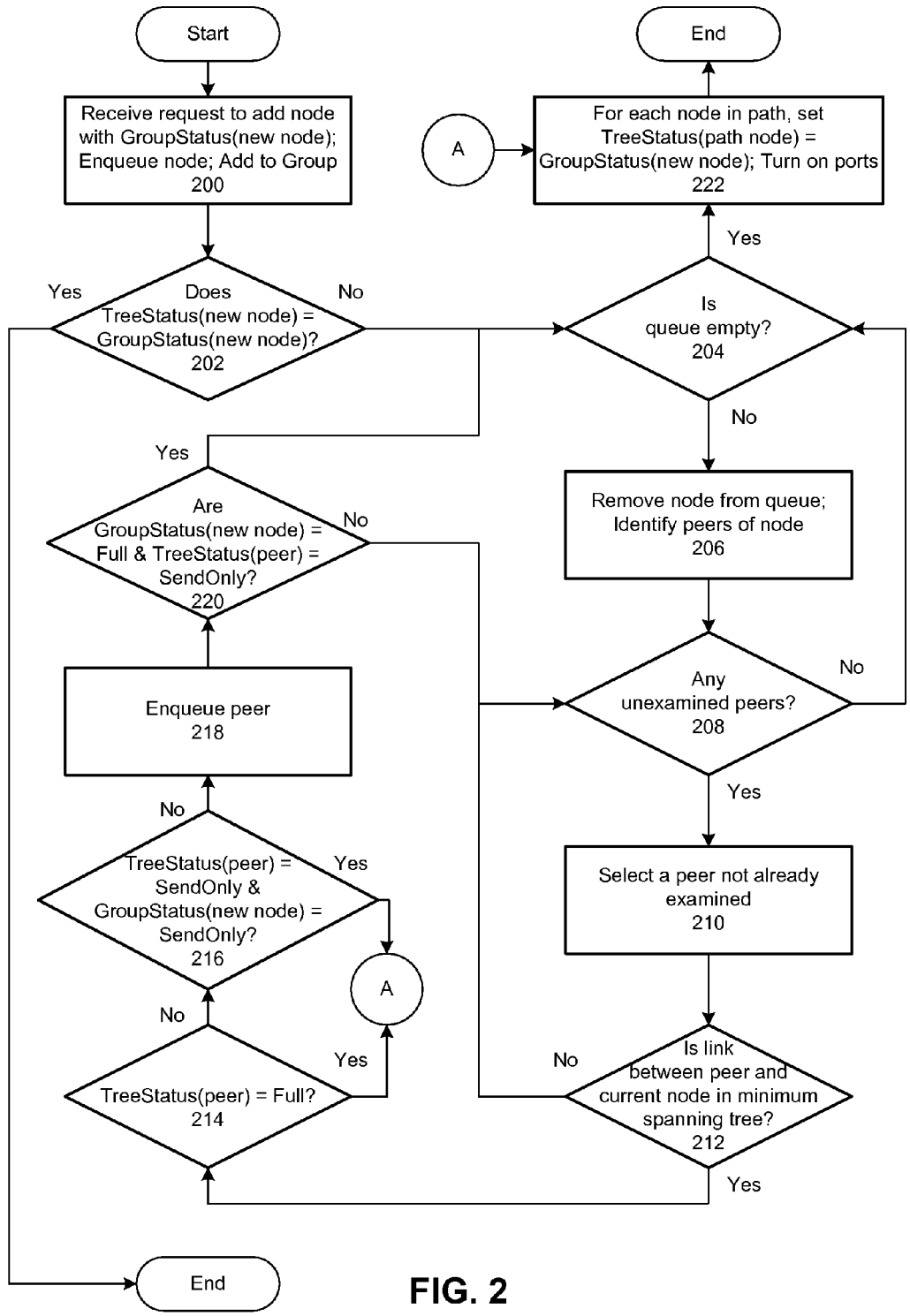
FIG. 2 is a flowchart illustrating a method of adding a node to a multicast group, in accordance with one embodiment of the invention.

FIG. 2 demonstrates a method of adding a network node to a multicast group, and configuring the group's multicast routing tree, according to one embodiment of the invention. In this embodiment, the group's MCT comprises a subset of the nodes and links in the network's MST.

In general, when adding a node to a group, the MST is traversed from the node (e.g., either breadth-first or depth-first) until a member of the group's MCT is located. Each member of the multicast group is included in the MCT, but a node may be part of the MCT without being a member of the group. Thus, a node's GroupStatus and TreeStatus may differ.

In different embodiments of the invention, the MST may be traversed breadth-first or depth-first. The manner in which it is traversed may depend upon factors such as the degree of the network, the location of group members within a subnet, etc.

In the illustrated procedure, if the node being added to the multicast group is to be added as a SendOnlyMember, the procedure can end when a SendOnlyMember of the group's MCT is found. If the node being added is to be a FullMember of the multicast group, a FullMember of the MCT must be located. However, if a SendOnlyMember is located, it can be used to facilitate the search for a FullMember. In particular, the search can be limited to the path leading from the SendOnlyMember to the rest of the multicast group members.

In operation 200, a request is received to add a network node as a member of the multicast group. The desired membership status (e.g., FullMember or SendOnlyMember) is included in the request and may be referred to as GS(node). The node is added to the group with the requested status, and is queued as a first entry in a stack or queue. The queue, or stack, will be used to store nodes to be examined while locating a path to the group's MCT. The new node's TreeStatus is not yet set.

In operation 202, the desired group membership status of the new node (i.e., GS(new node)) is compared to the node's present TreeStatus—TS(new node). If they differ, the method advances to operation 204. Otherwise, the node is already configured as needed for the desired GroupStatus, and so the method ends. Illustratively, the method may also end with operation 202 if the node's present TreeStatus is FullMember and the new group membership is SendOnlyMember.

In one alternative embodiment of the invention, instead of queuing the new node in operation 200, the node is not queued until operation 202, and is only queued if the comparison in operation 202 fails.

Operation 204 initiates a loop to examine each entry in the queue or stack, to determine if a route to the existing MCT has been discovered. Until the queue is empty, the illustrated procedure repeats any or all of operations 204-220. When the queue is empty, the procedure advances to operation 222.

In one embodiment of the invention, if the queue is empty at any time other than when adding a first node to the multicast group, an error may be signaled.

In operation 206, the entry placed in the queue most recently is removed for examination, and the peers (or link partners) of the node are identified. The node dequeued from the queue may be termed the "current node." In this embodiment, the peers of the current node include all other network nodes connected to the current node by one hop. Thus, a current node that is a switch may have many peers (e.g., up to 256 in one embodiment of the invention), while a current node that is a channel adapter or network interface circuit may have as few as one.

By removing the most recently queued node, the illustrated procedure applies a depth-first traversal of the network. In another embodiment of the invention, a breadth-first traversal may be applied.

In operation 208, it is determined whether all of the current node's peers have been examined by the procedure of FIG. 2. If so, the method returns to operation 204 to determine if the queue is now empty. Otherwise, the method continues with operation 210.

In operation 210, one of the current node's un-examined peers is selected for examination. If the current node has multiple un-examined peers, one may be selected at random, according to the lowest port number or GID, lowest cost, or through any other selection criteria.

In one embodiment of the invention, when a FullMember is being added to the multicast group, the illustrated procedure can be refined once a SendOnlyMember of the group is found. In particular, from that SendOnlyMember, as the MCT is traversed to find a FullMember, only peers that are SendOnlyMembers or FullMembers need to be examined. Operations 208 and/or 210 may be modified to implement this refinement.

In operation 212, it is determined whether the link between the new node and the selected peer is part of the network's minimum spanning tree (MST). If not, the illustrated method returns to operation 208 to check another peer of the current node. Otherwise, the illustrated method continues with operation 214.

In operation 214, the method determines whether the selected peer's TreeStatus is "full." If so, then the procedure has located a node that is already configured to send and receive the group's multicast messages. The new node can be connected to the group's MCT by coupling the new node to the selected peer. If the selected peer is a FullMember of the MCT, the method advances to operation 222; otherwise, the method continues with operation 216.

In operation 216, the method determines whether the selected peer's TreeStatus and the new node's GroupStatus are both SendOnlyMember. If so, then the method has located a node that is configured to provide the new node with the necessary type of connection to the group's MCT.

As in operation 214, the new node can be connected to the group's MCT with support for the node's GroupStatus by coupling the new node to the selected peer. If the selected peer is a SendOnlyMember of the MCT and the new node's requested GroupStatus is SendOnlyMember, the method advances to operation 222; otherwise, the method continues with operation 218.

In operation 218, the selected peer is enqueued. In this embodiment, a peer of a current node is enqueued only if the link between the peer and the current node is part of the network's MST. This helps ensure that the MCT will remain a tree and will contain no loops.

In operation 220, the method determines whether the TreeStatus of the selected peer is SendOnlyMember and whether the new node's GroupStatus is FullMember. If either comparison fails, the illustrated method returns to operation 208. Otherwise, if both determinations succeed, the method returns to operation 204. In this embodiment, if both determinations are true, no other peers of the current node need to be examined, because the selected peer, although not a FullMember, can be used to couple the new node to the MCT.

In operation 222, the method has succeeded in locating a network node that is a suitable member of the group's MCT for supporting the new node's GroupStatus. Therefore, for each network node in a path traversing the network's MST between the new node and the last selected node, inclusive, those network nodes' TreeStatuses are set to the new node's requested group status (i.e., FullMember or SendOnlyMember). This may cause one or more members of the MCT to be changed from SendOnlyMember status to FullMember status. If the last node selected and examined is a FullMember and the new node is being added to the group with SendOnlyMember status, the last node need not be downgraded to SendOnlyMember.

Thus, when a new node is added to a multicast group, it is coupled to the group's MCT via one or more links. The ports of the link partners to those links are then turned on or off and the partners' MFTs updated accordingly.

For example, when a new node is added as a FullMember of the group, for each link coupling the new node to the MCT, the link partner's ports for the link will be turned on to allow bidirectional communication. However, if the new node is being added as a SendOnlyMember, one or more link partners' ports may be turned (or remain) off because the new node will not need to receive the group's multicast messages. After operation 222, the method ends.

When removed from a multicast group, a FullMember or a SendOnlyMember is changed to a NonMember GroupStatus. An intermediate node may remain in the MCT, however, if the node is needed to route multicast messages. For example, when a member that is a channel adapter or other network interface adapter is removed from a multicast group, the switch(es) coupling the member to the rest of the MCT may be removed from the group and MCT if they were members only for the purpose of routing messages to the member that is being removed. Or, a switch may be a NonMember of the group while continuing to be a SendOnlyMember or FullMember of the group's MCT.

Thus, to prune the MCT when a member is removed, it must be determined why nearby switch nodes that are in the MCT were forwarding messages, and whether they still need to do so. Illustratively, this may be done by examining how many of a switch's ports are on (for forwarding group messages) and how many of the switch's peers are forwarding messages to the switch.

It also may be determined whether the switch itself is consuming the group's messages. Typically, the switch will only be configured to forward messages to other switches and connected end nodes, and thus need not be a FullMember of the group. However, if a management station or other entity on the switch requires the messages, then the switch may be a FullMember of the group, and the process of removing or downgrading a peer node may be altered accordingly.

Figure 3:
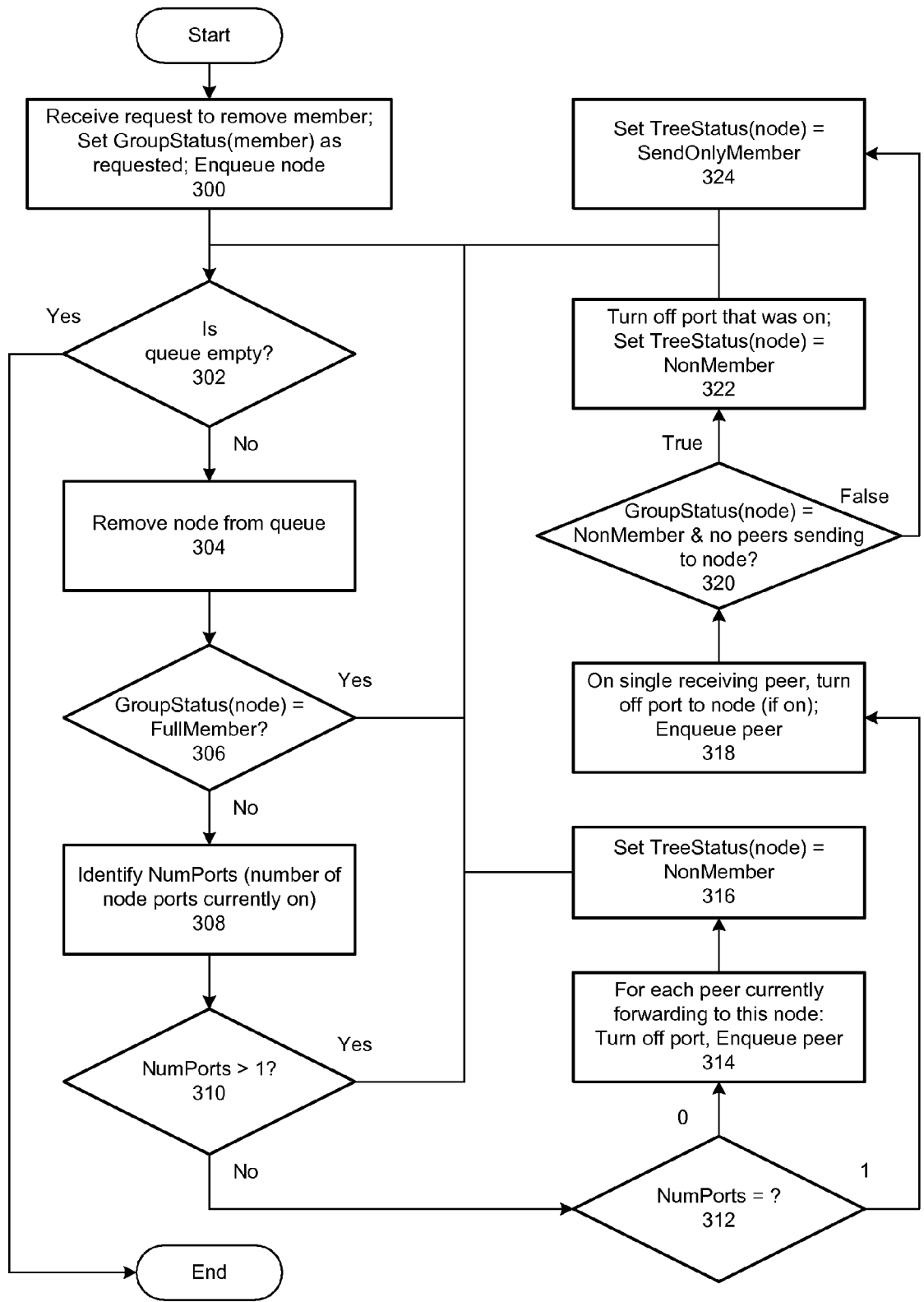
FIG. 3 is a flowchart illustrating a method of removing a node from a multicast group, in accordance with one embodiment of the invention.

FIG. 3 demonstrates a procedure for removing a member from a multicast group and pruning the group's MCT, according to one embodiment of the invention. In this embodiment, the illustrated method determines whether the member whose GroupStatus is being set to NonMember still needs to route multicast messages for other members. The procedure illustrated in FIG. 3 may also be applied when a member's GroupStatus is to be downgraded from FullMember to SendOnlyMember.

In general, when removing a member node from the group, that node's port coupling it to the MCT is turned off. Then, if no other ports are on, the node can be removed from the MCT and a determination is made if any peers can also be removed from the MCT. If one port is still on, it is determined whether that port can be turned off. If two or more ports are still on, then the node remains in the MCT for routing messages.

In operation 300, a request is received to remove a member from the multicast group. The member's GroupStatus is changed to either NonMember or SendOnlyMember, as specified in the request or by a default status setting. A queue or stack is initialized and the departing member is queued as a first entry.

In operation 302, a loop is started to examine each queued node in turn. If the queue is empty, the method ends; otherwise, the method continues at operation 304.

In operation 304, the top node in the queue is removed. Also, the peers or link partners of the node may be identified.

In operation 306, the present GroupStatus of the current node is examined. If the node is a FullMember of the multicast group, it will not be changed, and the illustrated method returns to operation 302; otherwise, the method continues at operation 308.

In operation 308, the number of local ports of the node that are currently configured to forward group multicast messages from the node is identified, and may be referred to as NumPorts.

In operation 310, it is determined whether the node has more than one local port on (i.e., whether the node is currently forwarding group multicast messages to more than one peer). If so, then the current node does not need to be modified and the method returns to operation 302.

Otherwise, in operation 312, the number of local ports that are on is considered. If no local ports are currently forwarding group multicast messages to peer nodes, the method continues with operation 314. If one local port is forwarding messages to a peer, the method advances to operation 318.

In operation 314, the current node is not routing messages to any peers. Therefore, the ports of any peers or neighbors through which messages were being sent to this node can be turned off. Also, each such peer is added to the queue to determine if it or any of its peers should be further modified.

In operation 316, the current node's TreeStatus is set to NonMember. The illustrated method then returns to state 302.

In operation 318, it has been determined that only one local port of the current node is on; therefore, the node is currently configured to forward group multicast messages to only one peer. However, because the current node doesn't route messages to any other peers, it does not need to receive messages from the single peer. Therefore, the peer's port to the current node can be turned off (if it is on). And, the peer is added to the queue. The peer's port may already be off. For example, if the current node's GroupStatus is SendOnlyMember, and it is only sending on one port, it does not (need to) receive messages from the link partner of that port, and that link partner's corresponding port may already be off.

In operation 320, the method determines if there are any other peers sending messages to the current node, and whether the node's current GroupStatus is NonMember. If both conditions exist, the method continues with operation 322; otherwise, the method advances to operation 324.

In operation 322, no peers are routing group multicast messages to the current node. And, the node GroupStatus is NonMember, which means that the node itself is not generating messages. Therefore, the node will not need to send messages to any other node, and the node's port that was on can be turned off, and the node's TreeStatus can be set to NonMember. The illustrated method then returns to operation 302.

In operation 324, there is at least one peer still sending to the current node, or the node's GroupStatus is not NonMember. In either case, the node's TreeStatus is set to SendOnlyMember. The method then returns to operation 302.

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A computer-implemented method of adding a new node to a network multicast group, with a specified group membership status, wherein members of a corresponding routing tree route multicast messages among members of the group, the method comprising:
   selecting a minimum spanning tree of the network;
   selecting the new node as the current node;
   examining the routing tree membership statuses of nodes that are linked to the current node by links included in the minimum spanning tree;
   until said examining is halted, selecting a peer node of the current node as the current node and repeating said examining;
   halting the examining when a final node is examined if:
      the final node is a Full member of the routing tree; or
      the final node is a SendOnly member of the routing tree and the specified group membership status of the new node is SendOnly; and
   for each given node in the path from the new node to the final node, setting the routing tree membership status of the given node equal to the specified group membership status of the new node.

2. The method of claim 1, further comprising:
   maintaining a queue for storing network nodes for selection as current node;
   wherein a first peer of a current node is added to said queue if:
      said first peer is coupled to the current node by a link included in the minimum spanning tree;
      said first peer is not a Full member of the routing tree; and
      the routing tree membership status of said first peer and the specified group membership status of the new node are not both SendOnly.

3. The method of claim 2, further comprising:
   determining if said queue is empty if:
      the specified group membership status of the new node is Full; and
      the routing tree membership status of said first peer is SendOnly.

4. The method of claim 2, further comprising:
   halting the examining if said queue is empty.

5. A computer readable medium storing instructions that, when executed by a computer, cause the computer to perform a method of adding a new node to a network multicast group, with a specified group membership status, wherein members of a corresponding routing tree route multicast messages among members of the group, the method comprising:
   selecting a minimum spanning tree of the network;
   selecting the new node as the current node;
   examining the routing tree membership statuses of nodes that are linked to the current node by links included in the minimum spanning tree;
   until said examining is halted, selecting a peer node of the current node as the current node and repeating said examining;
   halting the examining when a final node is examined if:
      the final node is a Full member of the routing tree; or
      the final node is a SendOnly member of the routing tree and the specified group membership status of the new node is SendOnly; and
   for each given node in the path from the new node to the final node, setting the routing tree membership status of the given node equal to the specified group membership status of the new node.

6. A computer-implemented method of adding a first node to a multicast group of network nodes, wherein members of a corresponding routing tree route multicast messages among members of the group, the method comprising:
   (a) receiving a first request to include a first network node in a multicast group as one of a Full member and a SendOnly member;
   (b) setting a GroupStatus of the first node according to the first request, wherein said GroupStatus indicates a membership status in the multicast group;
   (c) selecting a minimum spanning tree of the network;
   (d) selecting the first node as the current node;
   (e) selecting a peer node of the current node, wherein a TreeStatus of the selected peer has not been examined since the first request was received, wherein said TreeStatus indicates a membership status in the routing tree;
   (f) performing one or more of the following examinations:
      (f1) determining if said TreeStatus of the selected peer is Full;
      (f2) determining if said TreeStatus of the selected peer is SendOnly and said GroupStatus of the current node is SendOnly; and
      (f3) determining if a network link coupling the current node to the selected peer is part of the selected minimum spanning tree;
   (g) repeating steps (e) to steps (g) until one of:
      (g1) at least one peer of the current node has been examined; and
      (g2) one of said step (f1) and said step (f2) determinations succeed;

(h) if neither of said step (f1) and said step (f2) determinations has succeeded, setting a peer of the current node as the current node;
(i) repeating steps (e) to steps (h) until one of:
  (i1) all nodes in the routing tree have been examined; and
  (i2) one of said step (f1) and said step (f2) determinations succeed;
(j) for each given node in the minimum spanning tree, from the new node to the last peer examined, setting a TreeStatus of the given node equal to said GroupStatus of the new node.

7. The method of claim 6, further comprising, after step (d):
comparing said GroupStatus of the first node to said TreeStatus of the first node.

8. The method of claim 6, further comprising:
maintaining a queue in which to queue nodes for selection as the current node.

9. The method of claim 8, further comprising, if said step (f3) determination succeeds:
adding the selected peer to said queue.

10. The method of claim 9, further comprising,
if said step (f3) determination succeeds:
if said TreeStatus of the selected peer is SendOnly and said GroupStatus of the new node is Full, determining if said queue is empty.

11. A computer readable medium storing instructions that, when executed by a computer, cause the computer to perform a method of adding a first node to a multicast group of network nodes, wherein members of a corresponding routing tree route multicast messages among members of the group, the method comprising:
(a) receiving a first request to include a first network node in a multicast group as one of a Full member and a SendOnly member;
(b) setting a GroupStatus of the first node according to the first request, wherein said GroupStatus indicates a membership status in the multicast group;
(c) selecting a minimum spanning tree of the network;
(d) selecting the first node as the current node;
(e) selecting a peer node of the current node, wherein a TreeStatus of the selected peer has not been examined since the first request was received, wherein said TreeStatus indicates a membership status in the routing tree;
(f) performing one or more of the following examinations:
  (f1) determining if said TreeStatus of the selected peer is Full;
  (f2) determining if said TreeStatus of the selected peer is SendOnly and said GroupStatus of the current node is SendOnly; and
  (f3) determining if a network link coupling the current node to the selected peer is part of the selected minimum spanning tree;
(g) repeating steps (e) to steps (g) until one of:
  (g1) at least one peer of the current node has been examined; and
  (g2) one of said step (f1) and said step (f2) determinations succeed;
(h) if at least one peer of the current node has been examined, setting a peer of the current node as the current node;
(i) repeating steps (e) to steps (h) until one of:
  (i1) all nodes in the routing tree have been examined; and
  (i2) one of said step (f1) and said step (f2) determinations succeed;
(j) for each given node in the minimum spanning tree, from the new node to the last peer examined, setting a TreeStatus of the given node equal to said GroupStatus of the new node.

12. A computer-implemented method of adding a new node to a network multicast group, with a specified group membership status, wherein members of a corresponding routing tree route multicast messages among members of the group, the method comprising:
identifying a minimum spanning tree of the network;
selecting the new node as the current node;
until a final node having a routing tree membership status greater than or equal to the specified group membership status of the new node is identified, repeating:
  examining the routing tree membership statuses of peer nodes of the current node; and
  selecting as current node a peer node of the current node that is coupled to the current node by a link included in the minimum spanning tree; and
setting the routing tree membership status of each node in the minimum spanning tree, from the new node to the final node, to the specified group membership status of the new node.

13. The method of claim 12, wherein a node's routing tree membership status and group membership status are each one of the following, from lesser status to greater status: non-member, SendOnly, Full.

14. A computer readable medium storing instructions that, when executed by a computer, cause the computer to perform a method of adding a new node to a network multicast group, with a specified group membership status, wherein members of a corresponding routing tree route multicast messages among members of the group, the method comprising:
identifying a minimum spanning tree of the network;
selecting the new node as the current node;
until a final node having a routing tree membership status greater than or equal to the specified group membership status of the new node is identified, repeating:
  examining the routing tree membership statuses of peer nodes of the current node; and
  selecting as current node a peer node of the current node that is coupled to the current node by a link included in the minimum spanning tree; and
setting the routing tree membership status of each node in the minimum spanning tree, from the new node to the final node, to the specified group membership status of the new node.

15. A computer-implemented method of removing a first node from a network multicast group, wherein members of a corresponding routing tree route multicast messages among members of the group, the method comprising:
queuing the first node in a queue;
until the queue is empty, repeating the following, in order:
  (a) removing the most recently queued node to serve as the current node;
  (b) returning to step (a) if the group membership status of the current node is Full;
  (c) identifying a number of local ports of the current node that are on;
  (d) returning to step (a) if the number is greater than one;
  (e) if the number of local ports that are on is equal to zero:

(e1) for each peer node having a local port to the current node on, turning off said peer node's local port to the current node and adding said peer node to the queue; and (e2) setting the routing tree membership status of the current node to None; and (f) if the number of local ports that are on is equal to one:

(f1) on a sole peer node coupled to the one local port, turning off the sole peer node's local port to the current node if the sole peer's local port to the current node is on;

(f2) adding the sole peer node to the queue;

(f3) if zero peer nodes have local ports to the current node on and the group membership status of the current node is None:

turning off the one local port of the current node that is on; and setting the routing tree membership status of the current node to None; and (f4) otherwise, setting the routing tree membership status of the current node to SendOnly.

16. The method of claim 15, further comprising, prior to said repeating of steps (a) to steps (f):

setting the group membership status of the first node to one of None and SendOnly.

17. A computer readable medium storing instructions that, when executed by a computer, cause the computer to perform a method of removing a first node from a network multicast group, wherein members of a corresponding routing tree route multicast messages among members of the group, the method comprising:

queuing the first node in a queue;

until the queue is empty, repeating the following, in order:

(a) removing the most recently queued node to serve as the current node;

(b) returning to step (a) if the group membership status of the current node is Full;

(c) identifying a number of local ports of the current node that are on;

(d) returning to step (a) if the number is greater than one;

(e) if the number of local ports that are on is equal to zero:

(e1) for each peer node having a local port to the current node on, turning off said peer node's local port to the current node and adding said peer node to the queue; and (e2) setting the routing tree membership status of the current node to None; and (f) if the number of local ports that are on is equal to one:

(f1) on the sole peer node coupled to the one local port, turning off the sole peer node's local port to the current node if the sole peer's local port to the current node is on;

(f2) adding the sole peer node to the queue;

(f3) if zero peer nodes have local ports to the current node on and the group membership status of the current node is None:

turning off the one local port of the current node that is on; and setting the routing tree membership status of the current node to None; and (f4) otherwise, setting the routing tree membership status of the current node to SendOnly.

18. A computer-implemented method of removing a first node from a multicast group of network nodes, wherein members of a corresponding routing tree route multicast messages among members of the group, the method comprising:

receiving a first request to remove a first network node from membership in a multicast group, wherein the first node was one of a Full member and a SendOnly member of the multicast group;

setting a GroupStatus of the first node to one of None and SendOnly, wherein said GroupStatus indicates a membership status in the multicast group;

queuing the first node in a queue;

until the queue is empty, repeating:

(a) dequeuing a node from the queue to be the current node;

(b) determining if the GroupStatus of the current node is Full;

(c) determining a number of local ports of the current node that are on;

(d) if the number of local ports is equal to zero:

(d1) for each peer of the current node with a local port to the current node turned on:

(d1') setting the local port of the peer to off; and (d2") adding the peer to the queue; and (d2) setting a TreeStatus of the current node to None, wherein said TreeStatus indicates a membership status in the routing tree; and (e) if the number is equal to one:

(e1) on the one peer coupled to the one local port of the current node, setting the local port of the one peer to the current node to off;

(e2) adding the one peer to the queue;

(e3) if the GroupStatus of the current node is None and zero peers of the current node have a local port to the current node on:

(e3') turning off the one local port of the current node; and (e3") setting the TreeStatus of the current node to None; and (e4) otherwise, setting the TreeStatus of the current node to SendOnly.

19. The method of claim 18, wherein said step (a) comprises:

dequeuing a given node most recently added to the queue to be the current node.

20. A computer readable medium storing instructions that, when executed by a computer, cause the computer to perform a method of removing a first node from a multicast group of network nodes, wherein members of a corresponding routing tree route multicast messages among members of the group, the method comprising:

receiving a first request to remove a first network node from membership in a multicast group, wherein the first node was one of a Full member and a SendOnly member of the multicast group;

setting a GroupStatus of the first node to one of None and SendOnly, wherein said GroupStatus indicates a membership status in the multicast group;

queuing the first node in a queue;

until the queue is empty, repeating:

(a) dequeuing a node from the queue to be the current node;

(b) determining if the GroupStatus of the current node is Full;

(c) determining a number of local ports of the current node that are on;

(d) if the number is equal to zero:
   (d1) for each peer of the current node with a local port to the current node turned on:
      (d1') setting the local port of the peer to off; and
      (d1") adding the peer to the queue; and
   (d2) setting a TreeStatus of the current node to None, wherein said TreeStatus indicates a membership status in the routing tree; and
(e) if the number is equal to one:
   (e1) on the one peer coupled to the one local port of the current node, setting the local port of the one peer to the current node to off;
   (e2) adding the one peer to the queue;
   (e3) if the GroupStatus of the current node is None and zero peers of the current node have a local port to the current node on:
      (e3') turning off the one local port of the current node; and
      (e3") setting the TreeStatus of the current node to None; and
   (e4) otherwise, setting the TreeStatus of the current node to SendOnly.

21. A system for managing membership in a multicast group and a corresponding routing tree for routing multicast messages within the multicast group, the system comprising:
   a network node coupling the system to a network;
   a subnet administrator configured to receive requests to change the membership of the multicast group;
   a subnet manager configured to update network nodes' routing tables when the routing tree is modified in response to a change in membership of the multicast group; and
   a subnet management coordinator configured to:
      make a non-member into a Full or SendOnly member of the multicast group by:
         setting the group membership status of the non-member to the group membership status specified in a request that was received to make the non-member a member of the multicast group;
         identifying a minimum spanning tree of the network;
         selecting the non-member as the current node;
         until a final node having a routing tree membership status greater than or equal to the group membership status of the non-member is identified, repeating:
            examining the routing tree membership statuses of peer nodes of the current node; and
            selecting as current node a peer node of the current node that is coupled to the current node by a link included in the minimum spanning tree;
         setting the routing tree membership status of each node in the minimum spanning tree, from the non-member to the final node, to the specified group membership status of the new node;
      make a Full or SendOnly member into a non-member of the multicast group; and
      update the membership of the routing tree in response to a change in the membership of the multicast group.

22. The system of claim 21, wherein a node's routing tree membership status and group membership status are each one of the following, from lesser status to greater status: non-member, SendOnly, Full.

23. The system of claim 21, wherein said subnet management coordinator makes a Full or SendOnly member into a non-member of the multicast group by:
   queuing the member in a queue;
   until the queue is empty, repeating the following, in order:
      (a) removing the most recently queued member to serve as the current node;
      (b) returning to step (a) if the group membership status of the current node is Full;
      (c) identifying a number of local ports of the current node that are on;
      (d) returning to step (a) if the number is greater than one;
      (e) if the number is equal to zero:
         (e1) for each peer of the current node that has a local port to the current node on, turning off said peer's local port to the current node and adding said peer to the queue; and
         (e2) setting the routing tree membership status of the current node to non-member; and
      (f) if the number is equal to one:
         (f1) on the one peer coupled to the one local port, turning off the peer's local port to the current node;
         (f2) adding the one peer to the queue;
         (f3) if zero peers have local ports to the current node on and the group membership status of the current node is non-member:
            turning off the one local port of the current node that is on; and
            setting the routing tree membership status of the current node to non-member; and
         (f4) otherwise, setting the routing tree membership status of the current node to SendOnly.

* * * * *